(No Model.)  5 Sheets—Sheet 1.
G. D. PAUL.
Letter Box.
No. 237,315.  Patented Feb. 1, 1881.
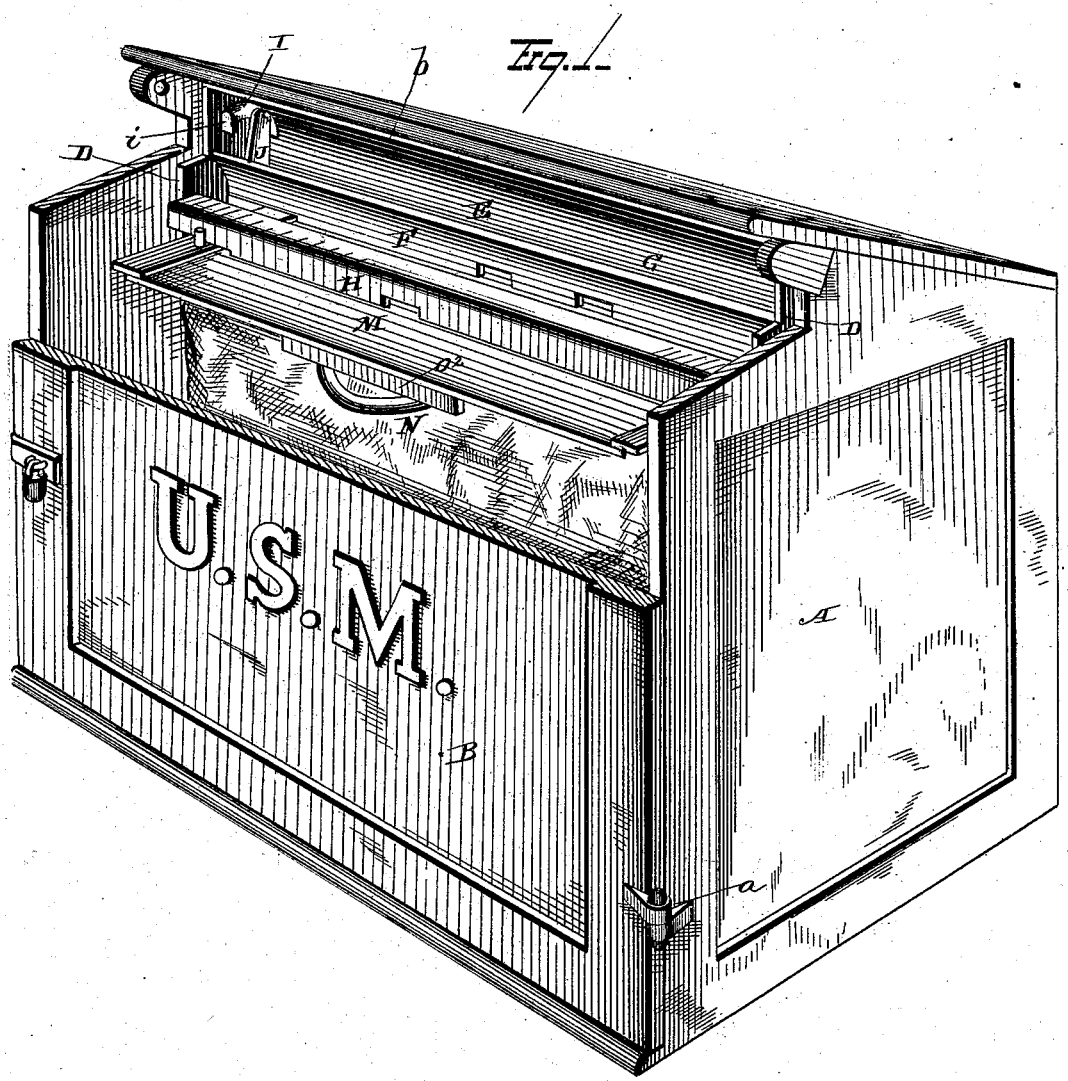
WITNESSES
E. I. Nottingham
Geo D Seymour
INVENTOR
Geo D Paul
By Leggett & Leggett
ATTORNEYS (No Model.) 5 Sheets—Sheet 2.
G. D. PAUL.
Letter Box.
No. 237,315. Patented Feb. 1, 1881.
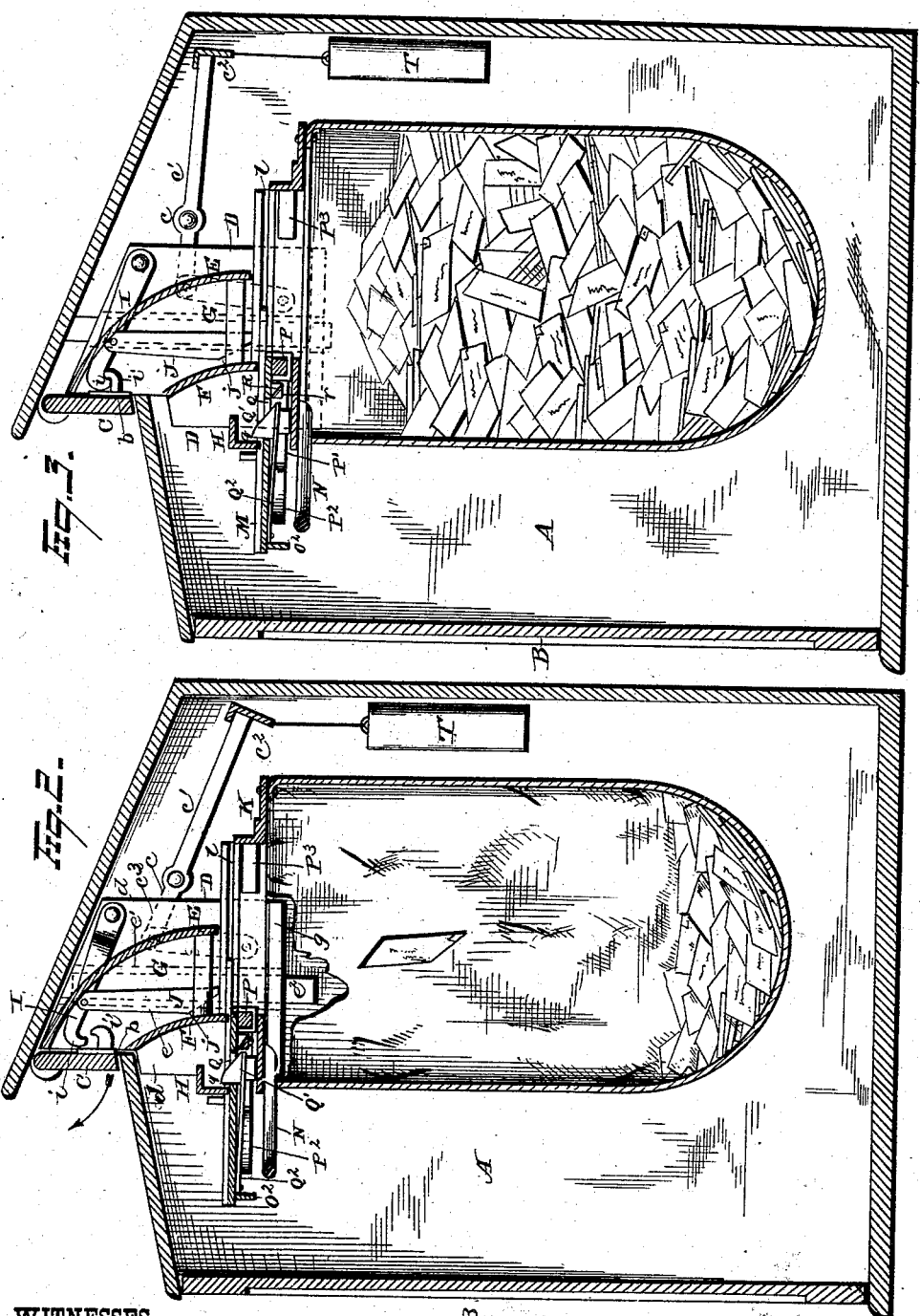
WITNESSES
E. J. Nottingham
Geo. D. Seymour
INVENTOR
Geo. D. Paul,
By Leggett & Leggett,
ATTORNEYS (No Model.) 5 Sheets—Sheet 3.
G. D. PAUL.
Letter Box.
No. 237,315. Patented Feb. 1, 1881.
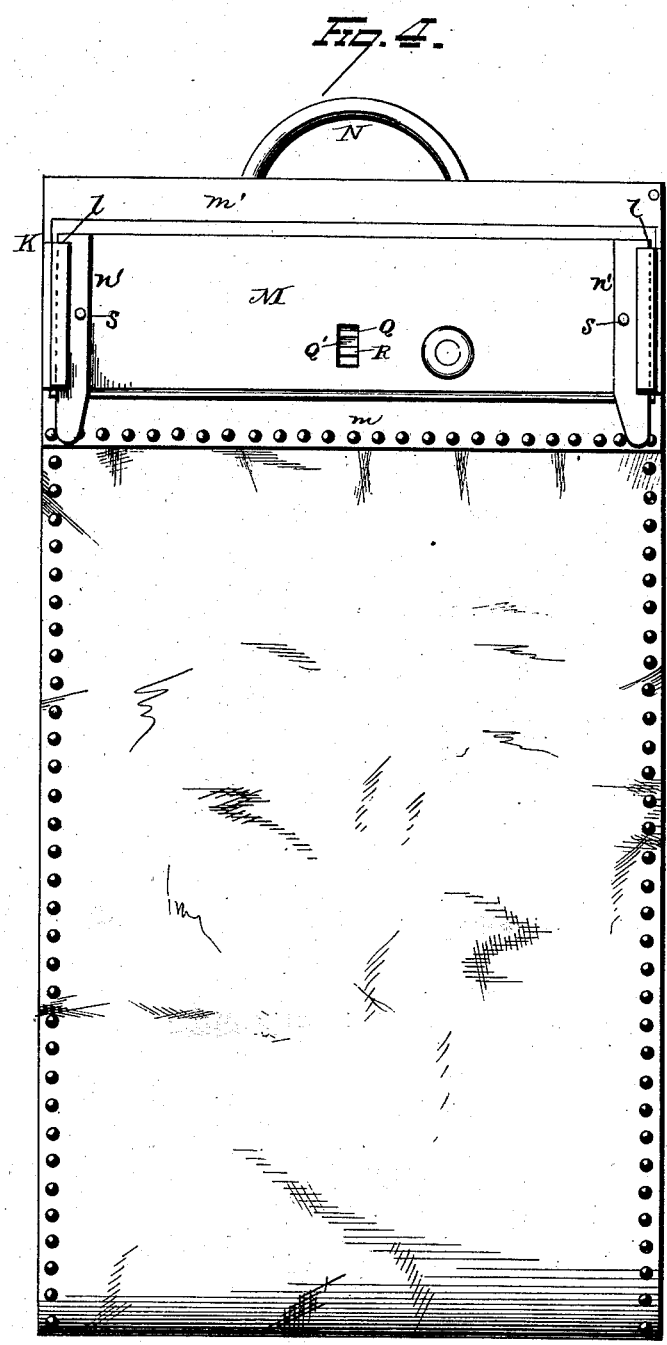
WITNESSES
E. J. Nottingham
Geo D. Seymour.
INVENTOR
Geo. D. Paul.
By Leggett & Leggett,
ATTORNEYS (No Model.) 5 Sheets—Sheet 4.
G. D. PAUL.
Letter Box.
No. 237,315. Patented Feb. 1, 1881.
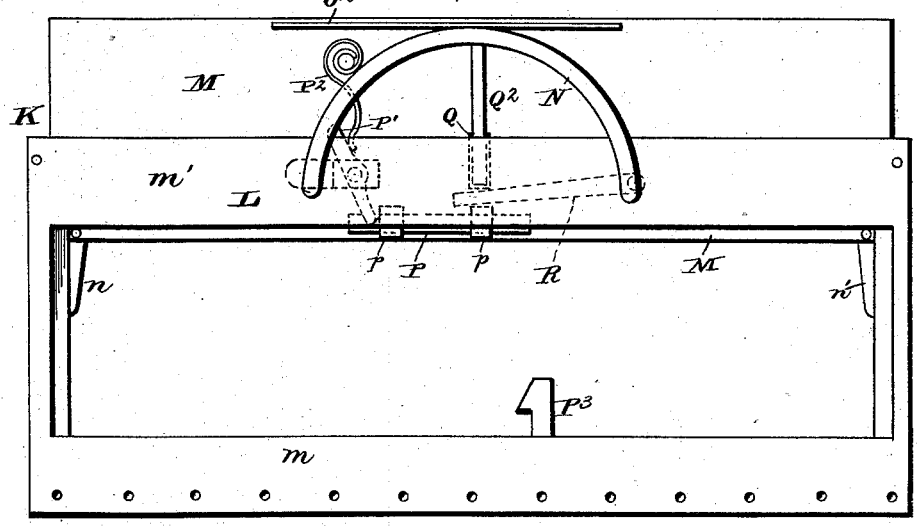
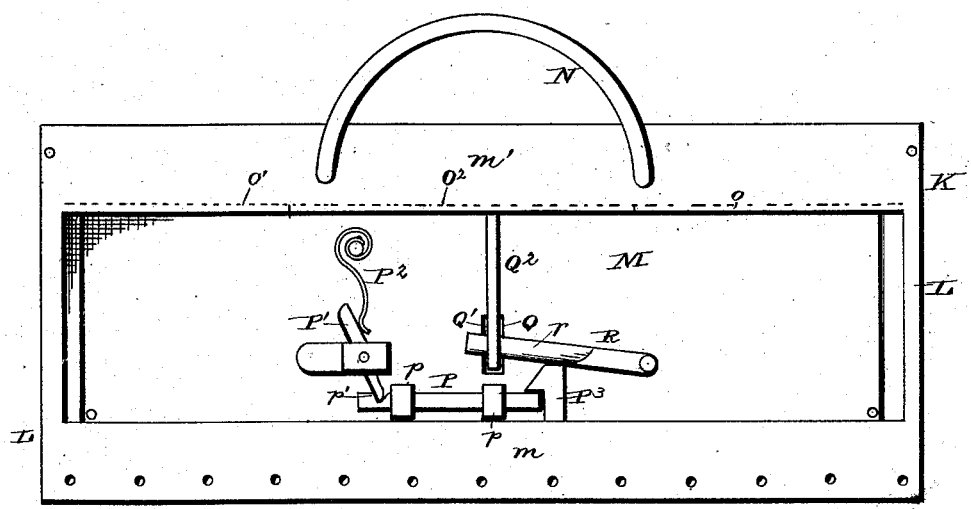
WITNESSES
E. J. Nottingham
Geo. D. Seymour
INVENTOR
Geo. D. Paul.
By Leggett & Leggett
ATTORNEYS (No Model.) 5 Sheets—Sheet 5.
G. D. PAUL.
Letter Box.
No. 237,315. Patented Feb. 1, 1881.
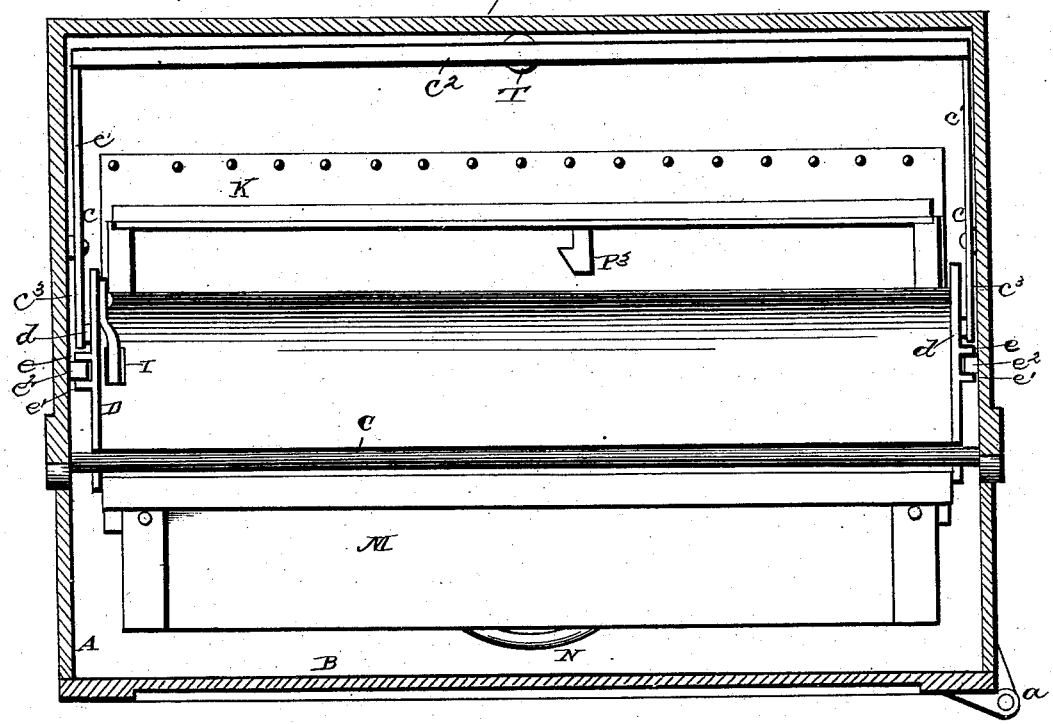
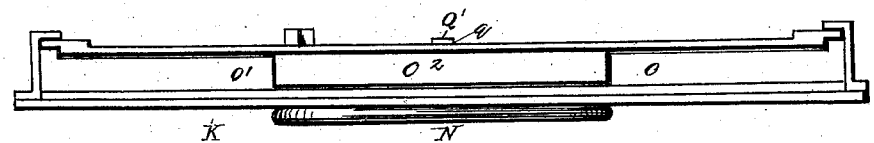

UNITED STATES PATENT OFFICE.

GEORGE D. PAUL, OF NEW YORK, N. Y., ASSIGNOR TO HIMSELF, ROBERT B. HURD, OF PATERSON, AND ELIZABETH F. R. TERRY, OF BRICKSBURG, NEW JERSEY, AND WILLIAM LISLE, JR., OF BROOKLYN, NEW YORK.

LETTER-BOX.

SPECIFICATION forming part of Letters Patent No. 237,315, dated February 1, 1881.

Application filed March 17, 1880. (No model.)

*To all whom it may concern:*

Be it known that I, GEORGE D. PAUL, of New York, in the county of New York and State of New York, have invented certain new and useful Improvements in Letter-Boxes and Mail-Bags; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in letter-boxes and mail-bags, the object being to insure the safety of letters deposited in letter-boxes, and to enable the letters deposited in such boxes to be readily and quickly collected and safely transported to the post-office.

My invention consists, first, in the combination, with a letter-box, of a mail-bag adapted to be inserted within the box and secured beneath the trap or opening for letters and receive the letters as they are dropped into the box.

My invention further consists in the combination, with a letter-box, of a mail-bag adapted to have its mouth-piece automatically opened as it is inserted into the letter-box and automatically closed and locked as it is withdrawn therefrom.

My invention further consists in a letter-box provided with a vertically-movable letter-bag support and devices for automatically locking the trap or cover when a predetermined weight of mail-matter has been deposited in the mail-bag.

My invention further consists in certain other details of construction and combinations of parts, as will hereinafter be described, and pointed out in the claims.

In the accompanying drawings, Figure 1 is a view, in perspective, of the interior of a letter-box provided with my improvement, a portion of the letter-box being cut away to illustrate more clearly the construction and relative arrangement of parts within the box. Fig. 2 is a view in vertical transverse section, showing the relative position of parts when the letter-box is open for receiving letters. Fig. 3 is a similar view, showing the relative position of the parts when the letter-bag is full and its weight has automatically locked the trap of the letter-box. Fig. 4 is a view in side elevation of my improved mail-bag. Fig. 5 is a plan view of the under or rear side of the mouth-piece of the mail-bag when unlocked. Fig. 6 is a similar view, showing the mouth-piece locked. Fig. 7 is a plan view of the mouth-piece of the mail-bag secured to the letter-chute, the upper portion of the letter-box being removed. Fig. 8 is an edge view of the mouth-piece of the bag.

A represents a letter-box, which may be of ordinary or of any desired form, and made of cast-iron or of any suitable material. Side B of the box is hinged at $a$, forming a door, which is secured by a lock attached to the box, or by a padlock. The upper portion of the box is furnished with the usual form of pivoted trap C, which, upon being raised, allows the letters to be inserted through the letter-opening $b$.

Within the upper portion of the letter-box are pivoted the levers $c$, (one to each side of the box,) the long arms $c'$ of which are connected by bar, rod, or plate $c^2$, while the short arms $c^3$ are pivoted to the opposite ends, $d$, of a letter chute or conduit, D. In order to retain the letter-chute D in proper position and insure its being moved in a vertical line, the ends $d$ are furnished with guide-flanges $e\ e'$, which engage with the guide bars or rods $e^2$, and thus cause the chute to be retained against displacement. Chute D consists of the outer curved plate, E, and inner curved plate, F, the lower edges of which are practically in the same horizontal plane, while the curved plate E extends above the plate F a distance equal to the width of the letter-opening $b$ in the letter-box, so that when the chute is in its raised or elevated and operative position the upper edge of plate E will register with the upper edge of letter-opening $b$, and the upper edge of plate F with the lower edge thereof, and thereby form a curved passage, G, through which the letters are conducted as they are dropped into the box. The ends of the chute D are furnished with inwardly-projecting flanges $g$ on their lower ends, while a cross bar or plate, H, is attached at its opposite ends to the ends of the chute.

To one end of the chute is pivoted a gravity dog or hook, I, which is provided on its free end with a hook, $i$, that engages with a catch or hook, $i'$, fastened to the inner side of the trap C. The hook or dog I has a downwardly-projecting bar or arm, J, pivoted thereto, the lower end of said arm beveled at $j$, for a purpose hereinafter explained.

K represents the mouth-piece of a letter-bag. It consists of the frame L and sliding plate M. The frame L is provided with the side plates, $m\ m'$, to which the upper end of the bag is secured in any desired manner. To the plate $m'$ is secured the handle N. The ends of the frame L are furnished with grooves $l$, in which are inserted the ends of the sliding plate M, or the plates $n\ n'$, secured to the opposite ends of said sliding plate. The side plate $m'$ is provided with the two flanges $o\ o'$, while the sliding plate M is furnished with the central flange, $o^2$, the latter being located adjacent to the locking mechanism, so that when the mouth-piece is locked the three flanges $o\ o'\ o^2$ constitute a complete and continuous flange for preventing access to the lock.

Upon the inner side of plate M is secured a sliding bolt, P, within the guides $p\ p$. One end of the bolt is furnished with a groove or slot, $p'$, in which engages one end of a lever or trigger, P', the opposite end thereof being subjected to the pressure of a spring, P², which serves to retain the sliding bolt in engagement with the catch P³, secured to the frame. By turning the lever or trigger P' by a key the bolt may be retracted and disengaged from the catch P³, thereby allowing the plate M to be moved in its bearings and the mouth-piece of the bag opened. Plate M is provided with a slot, Q, within which is placed a beveled stop-catch, Q', it being supported upon a spring, Q².

To the under side of plate M is pivoted a lever, R, having its outer end beveled, as at $r$. When the plate M is forced toward the catch P³ to lock the bag, the beveled end of lever R is forced against the beveled edge of the catch Q', and thereby serves to depress the latter.

Having described the essential features of construction and arrangement of parts in my improvement, I will describe its operation.

The hinged door of the letter-box is unlocked and opened, and the letter-bag then inserted in the letter-box, and the ends of the frame L of the mouth-piece placed upon the supporting-flanges $g$, formed upon the depending ends of the letter-chute, within the letter-box. The frame L being forced inwardly, (it being understood that the bag is unlocked,) the pins or lugs $s\ s$, projecting outward from the sliding plate M, engage with the cross bar or plate H, thus arresting the movement of plate M and allowing the frame L to be moved rearwardly beneath the chute, thereby causing the open mouth of the letter-bag to register with the lower end of the letter-chute. The rear cross bar or plate, $c^2$, connected with the long arms $c^3$ of the levers $c$, is furnished with a weight, T, which is determined by the size of the bag—that is to say, sufficient weight is attached to the cross-bar $c^2$ to hold the letter-bag in its raised position until the bag is nearly filled with letters. If not sooner removed, and when a predetermined amount of mail-matter has been placed in the bag, it will, by its superior weight, overcome the weight T, raising the latter, and depress the letter-chute, causing the pivoted dog or catch to engage with the catch-piece on the trap, and thus prevent the latter from being opened. Thus the letter-box will remain locked until the filled bag is removed and an empty bag substituted therefor. The trap is retained in its unlocked condition while the bag is being filled by means of the side of the mouth-piece of the letter-bag, which engages with the lower end of the arm connected with the pivoted catch-lever, and operates to raise the latter and prevent it from engaging with the catch-piece on the trap until the letter-bag is filled sufficiently to depress the chute, as hereinbefore explained. When the mouth-piece of the bag is inserted in place the beveled surface of the stop-catch Q' strikes the cross bar or plate H, and is thereby depressed, thus enabling the stop-catch Q' to be forced beneath the plate H, when it is raised by its supporting-spring, and its square shoulder $q'$, engaging with the cross bar or plate H, prevents the withdrawal of the sliding plate, except as follows: The letter-bag having been filled, the hinged door of the letter-box is unlocked and opened. The handle on the frame L is then grasped by the letter-carrier and the frame L pulled outwardly, the sliding plate M being held stationary by the stop-catch Q'. As the bolt-catch P³ on the frame L of the mouth-piece retracts the sliding bolt and allows the latter to engage therewith, and automatically lock the letter-bag, the catch also strikes the bar or lever R, forcing the same rearwardly, and causing its beveled edge $r$ to engage with the upper beveled edge of the stop-catch Q', depressing the latter, and securing it in such depressed position within the slot Q. The letter-bag, now being locked and its mouth-piece released from engagement with the cross bar or plate of the letter-chute, may be readily withdrawn, while the trap of the letter-box remains locked until another letter-bag is inserted in the letter-box.

By the employment of letter-boxes and bags embodying my invention the contents of the letter-boxes may be collected in wagons in a very short time; and, further, the letter-bags are automatically fastened when withdrawn from the letter-boxes, thus insuring an additional safeguard against loss through the dishonesty of the collectors.

The letter-traps of the letter-boxes are automatically locked when the letter-bags are filled, thus preventing any danger of choking the letter box or bag.

The several parts of the improvement may be made of either sheet metal or cast-iron, and made strong and durable.

While I have shown one form of lock for the letter-bag simply to illustrate the principle of my invention, I would have it understood that I do not limit myself to locks of such construction, as the bags will be furnished with tumbler-locks to be opened only by a key.

Boxes and bags of the construction described are well adapted for elevated-railroad stations and other places where tickets or letters are dropped in boxes, and it is desirable to prevent their being lost or stolen in transportation to headquarters.

Having fully described my invention, what I claim as new, and desire to secure by Letters Patent, is—

1. The combination, with a letter-box, of a mail or letter bag and devices for securing the latter within the box and beneath the trap or opening for letters, to receive the letters as they are dropped into the box, substantially as set forth.

2. The combination, with a letter-box, of a mail-bag and devices for securing the mail-bag within the letter-box, to receive letters as they are dropped therein, and to automatically open the mouth-piece of the mail-bag when inserted in its place in the letter-box, substantially as set forth.

3. The combination, with a letter-box, of a mail-bag and devices for securing the mail-bag within the letter-box, to receive letters as they are dropped therein, and to automatically close the mouth-piece of the mail-bag as it is withdrawn from the letter-box, substantially as set forth.

4. The combination, with a letter-box, of a mail-bag and devices for securing the mail-bag within the letter-box, to receive letters as they are dropped therein, and to automatically open and close the mouth-piece of the mail-bag as it is inserted and withdrawn from the letter-box, substantially as set forth.

5. The combination, with a letter-box, of a mail-bag and devices for securing the mail-bag within the letter-box, to receive letters as they are dropped therein, and to automatically close and lock the mouth-piece of the mail-bag as it is withdrawn from the letter-box, substantially as set forth.

6. The combination, with a letter-box, of a movable mail-bag support located beneath the trap or cover, and devices for automatically locking the trap or lid of the letter-box when a predetermined weight of mail-matter has been deposited in the mail-bag, substantially as set forth.

7. The combination, with the trap or lid of a letter-box, of a sliding letter-chute and a fastening device for locking the trap or lid, substantially as set forth.

8. The combination, with the pivoted trap or lid of a letter-box, a sliding chute located within the letter-box, and a catch arranged to lock the trap or lid when the sliding chute is depressed, of a mail-bag provided with a mouth-piece adapted to be removably secured to the lower end of the sliding chute, substantially as set forth.

9. The combination, with the pivoted trap or lid of a letter-box, a sliding chute located within the letter-box, and a catch arranged to lock the trap or lid when the sliding chute is depressed, of a mail-bag provided with a mouth-piece adapted to be removably secured in guideways formed on the lower end of said chute, and a depending rod attached to said catch and arranged to be raised by the mouth of the mail-bag when inserted, and thereby unlock the trap or lid, substantially as set forth.

10. The combination, with the sliding letter-chute, of a mail-bag provided with a yielding stop-catch, for retaining the mouth-piece in engagement with the letter-chute until locked, substantially as set forth.

11. The combination, with a letter-box and a mail-bag support located therein, of a mail-bag mouth-piece and devices for retaining the mouth-piece in place until locked, and then to automatically release the mail-bag from engagement with the mail-bag support, substantially as set forth.

12. The combination, with a mail or letter bag having a mouth-piece composed of a stationary frame and a sliding plate, of a letter-box provided with a letter-chute having guideways connected with its lower end, for receiving the mouth-piece of the mail or letter bag and retaining the bag suspended beneath the letter-chute for receiving letters as they are dropped in the box, substantially as set forth.

13. The combination, with a mail or letter bag having a mouth-piece composed of a stationary frame and a sliding plate, of a letter-box provided with a letter-chute having guideways connected with its lower end, for receiving the mouth-piece of the mail or letter bag and retaining the bag suspended beneath the letter-chute, and devices for automatically opening the mouth-piece of the mail-bag when inserted in its place in the letter-box, substantially as set forth.

14. The combination, with a mail or letter bag having a mouth-piece composed of a stationary frame and a sliding plate, of a letter-box provided with a letter-chute having guideways connected with its lower end, for receiving the mouth-piece of the mail or letter bag and retaining the bag suspended beneath the letter-chute, and devices for automatically closing the mouth-piece of the mail-bag as it is withdrawn from the letter-box, substantially as set forth.

15. The combination, with a mail or letter bag having a mouth-piece composed of a stationary frame and a sliding plate, of a letter-box provided with a letter-chute having guideways connected with its lower end, for receiving the mouth-piece of the mail or letter bag and retaining the bag suspended beneath the letter-chute, and devices for automatically opening and closing the mouth-piece of the bag as it is inserted and withdrawn from the letter-box, substantially as set forth.

16. The combination, with a mail or letter bag having a mouth-piece composed of a stationary frame and a sliding plate, of a letter-box provided with a letter-chute having guideways connected with its lower end, for receiving the mouth-piece of the mail-bag and retaining the bag suspended beneath the letter-chute, and devices for automatically closing and locking the mouth-piece of the mail-bag as it is withdrawn from the letter-box, substantially as set forth.

17. The combination, with a mail or letter bag having a mouth-piece composed of a stationary frame and a sliding plate, of a letter-box provided with a sliding letter-chute having guideways connected with its lower end, for receiving the mouth-piece of the mail-bag and retaining the bag suspended beneath the letter-chute, and devices for automatically locking the trap or lid of the letter-box when a predetermined weight of mail-matter has been deposited in the mail-bag, substantially as set forth.

18. The combination, with a mail or letter bag having a mouth-piece composed of a stationary frame and a sliding plate, of a letter-box provided with a sliding chute having guideways connected with its lower end, for receiving the mouth-piece of the mail-bag and retaining the bag suspended beneath the letter-chute, and devices for unlocking the trap or lid fastening mechanism when the mouth-piece is inserted in place beneath the letter-chute, substantially as set forth.

19. The combination, with a mail or letter bag having a mouth-piece composed of a stationary frame and a sliding plate, of a letter-box provided with a letter-chute having guideways connected with its lower end, for receiving the mouth-piece of the mail-bag and retaining the bag suspended beneath the letter-chute, and a yielding stop-catch attached to the sliding plate of the mouth-piece, for retaining the latter in engagement with the letter-chute until the mouth-piece is locked, substantially as set forth.

20. The combination, with a mail or letter bag having a mouth-piece composed of a stationary frame and a sliding plate, of a letter-box provided with a letter-chute having guideways connected with its lower end, for receiving the mouth-piece of the mail-bag and retaining the bag suspended beneath the letter-chute, and devices for retaining the mouth-piece of the bag in connection with the letter-chute until the bag is locked, and then to automatically release the mouth-piece from engagement with the letter-chute, substantially as set forth.

In testimony that I claim the foregoing I have hereunto set my hand and seal this 6th day of March, 1880.

GEORGE D. PAUL. [L. S.]

Witnesses:
WM. H. MEEKS,
GEORGE T. BENTLEY.